United States Patent [19]

Williams

[11] Patent Number: 5,249,225
[45] Date of Patent: Sep. 28, 1993

[54] SELF-BALANCING HYBRID USING DIGITALLY PROGRAMMABLE ATTENUATOR FOR VARIABLE IMPEDANCE ELEMENTS

[75] Inventor: Arthur B. Williams, Smithtown, N.Y.

[73] Assignee: Coherent Communications Systems Corp., Hauppauge, N.Y.

[21] Appl. No.: 782,402

[22] Filed: Oct. 25, 1991

[51] Int. Cl.[5] .................... H04M 1/58; H04M 1/76
[52] U.S. Cl. ............................ 379/404; 379/398; 379/406
[58] Field of Search ............ 379/399, 402, 403, 404, 379/398, 406

[56] References Cited

U.S. PATENT DOCUMENTS

| | | | |
|---|---|---|---|
| 3,177,295 | 4/1965 | Lane | 179/81 |
| 3,548,111 | 12/1970 | Kleissl | 179/81 |
| 4,004,102 | 1/1977 | Ott | 179/16 F |
| 4,346,267 | 8/1982 | Dijkmans | 179/170 NC |
| 4,351,060 | 9/1982 | Treiber | 375/12 |
| 4,357,495 | 11/1982 | Sweet et al. | 179/77 |
| 4,365,119 | 12/1982 | Chung et al. | 179/170.2 |
| 4,567,331 | 1/1986 | Martin | 179/170 NC |
| 4,622,442 | 11/1986 | Martin | 379/402 |
| 4,742,540 | 5/1988 | Schingh | 379/403 |
| 4,791,668 | 12/1988 | Pringle | 379/398 |
| 4,881,262 | 11/1989 | Meschkat et al. | 379/402 |
| 4,918,725 | 4/1990 | Takahashi | 379/394 |
| 5,034,978 | 7/1991 | Nguyen et al. | 379/403 X |

Primary Examiner—James L. Dwyer
Assistant Examiner—Paul A. Fournier
Attorney, Agent, or Firm—Eckert Seamans Cherin & Mellott

[57] ABSTRACT

A digitally programmable attenuator balances impedance across a two to four-wire hybrid to reduce echo. The hybrid can interface a two-wire bi-directional telephone line, used for both transmit and receive signals with four-wire circuits having separate unidirectional transmit and receive signal paths. The four-wire circuit interfaces the two-wire circuit through a transformer. Optimum isolation is obtained by setting impedance $Z_{BAL}$ equal to the impedance of the line including the transformer ($Z_{LINE}$). The invention eliminates manual or customized individual adjustment of $Z_{BAL}$ by a set up technician by use of a digitally controlled attenuator to electronically vary the value of $Z_{BAL}$ in a highly precise fashion. The programmable attenuator provides an input voltage to a buffer voltage-follower amplifier. The output of the follower amplifier is coupled to a known impedance to limit current flow through the impedance and consequently, current flow through $Z_{BAL}$. Data to the attenuator is provided from a DSP programmed to sense and automatically converge to a balanced condition.

17 Claims, 5 Drawing Sheets

SELF-BALANCING HYBRID USING DIGITALLY PROGRAMMABLE ATTENUATOR FOR VARIABLE IMPEDANCE ELEMENTS

BACKGROUND OF THE INVENTION

1. Field of the Invention

This invention relates to self-balancing hybrids and in particular to a self-balancing hybrid having a digitally programmable attenuator for varying the impedance of a balancing element.

2. Prior Art

A hybrid is a device for coupling two-wire and four-wire sections of a bi-directional signal path. A hybrid is typically used in telephone voice terminal equipment for interfacing a two-wire bi-directional line used for carrying both transmit and receive voice signals to a four-wire system having a separate unidirectional transmit and receive signal path. It is important that a hybrid isolate the transmit and receive signal paths on the four-wire side to minimize echo perceived at the station remote from the hybrid.

Isolating the transmit signal from the receive signal generally involves matching a balancing impedance with the impedance of the line, which is coupled through a winding of a coupling transformer. The line impedance, however, is not easily determinable since it is mainly due to parasitic capacitance and resistance of the line and is partly dependent on line length, which varies from one connection to another. Prior art systems, therefore, require the balancing impedance to be empirically selected by a technician setting up the terminal equipment. Typically, the balancing impedance consists of a variable resistor in parallel with a plurality of separately switchable capacitors.

In prior art designs, the balancing impedance was manually adjusted. A technician, monitoring trans-hybrid rejection (four-wire transmit and receive signal isolation) closed the appropriate switches and adjusted the variable resistor until the best available trans-hybrid rejection was achieved. This process is time consuming and not wholly accurate since the capacitance is variable only in a limited number of coarse discrete steps through the switching arrangement.

A number of U.S. patents disclose impedance balancing circuits for two-wire to four-wire hybrids. For example, U.S. Pat. No. 4,351,060—Treiber discloses means for automatically digitally synthesizing an output impedance. The output impedance may be a matching line terminating impedance. The device eliminates analog two to four-wire converters by performing the two to four-wire conversion function digitally. Treiber requires a plurality of additional active elements for operation. For example, Treiber requires analog to digital converters, summing means and digital filters.

U.S. Pat. No. 4,357,495—Sweet et al. discloses a balancing system wherein the circuit is balanced by monitoring line voltages. A monitoring circuit is connected to the line voltage supply so that the variations in line conditions cause compensatory variations in the line voltage supply. This approach is undesirable since the parameter which determines line balance, namely the respective impedances, is not manipulated directly. Instead the signal is distorted (the voltage varied) as a means to balance the circuit. Another example of a two-wire to four-wire hybrid having an adjustable impedance system is disclosed in U.S. Pat. No. 4,365,119—Chung et al. Chung et al discloses an automatically adjustable impedance system for a two to four-wire hybrid which uses a programmable control unit to automatically adjust an impedance circuit and an adjustable capacitor. Chung further discloses an active element for supplying a signal to be cancelled to the inverting input of a difference amplifier coupled to a transformer.

U.S. Pat. No. 4,918,725—Takahashi discloses a terminal impedance setting circuit for a two-wire to four-wire converting circuit. The circuit includes a semiconductor switch for selecting any of a plurality of shunt resistors in response to a command for setting a terminal impedance value. Takahashi also uses negative feedback circuits and amplifiers.

The art further contains a number of circuits for providing balancing impedances, not specifically for two-wire to four-wire hybrids. Included is U.S. Pat. No. 3,177,295—Lane et al. Lane et al. discloses a self-regulating two-terminal impedance network for use in the telephone system substation. The circuit is an automatic regulating arrangement for effecting automatic sensitivity regulation in impedance, dependent upon the magnitude of direct current flowing in the line wires and supplied from an exchange.

U.S. Pat. No. 3,548,111—Kleissl discloses means for terminating the remote end of a subscriber line with a coupling circuit whose impedance matches the line impedance. The invention provides for coupling a partly capacitive supplemental impedance means at the remote end in parallel across the subscriber lines.

U.S. Pat. No. 4,004,102—Ott discloses an automatic impedance matching network for transmission lines including an impedance monitor which provides control signals to a low frequency and a high frequency compensator. The disclosure of Ott alters the impedance of the transmission line in response to the frequency of the signal being transmitted.

U.S. Pat. No. 4,346,267—Dijkmans discloses a hybrid circuit for coupling a four-wire transmission path to a two-wire path including a balancing impedance. The balancing impedance is not automatically adjustable.

Martin, U.S. Pat. Nos. 4,567,331 and 4,622,442, disclose two-wire to four-wire coupling hybrid circuits having unspecified balancing networks known as BAL-NET.

U.S. Pat. No. 4,742,540—Schingh discloses an electronic switching network for switching one or two impedance balancing networks through a telephone line under microprocessor control.

U.S. Pat. No. 4,791,668—Pringle discloses a line interface circuit having a predetermined source or terminating AC impedance selectable by means of semi-conductor switch elements.

U.S. Pat. No. 4,881,262—Meschkat et al. discloses an electronic hybrid circuit having a predetermined complex internal impedance for providing circuit balance.

A circuit is needed which provides a necessary balancing impedance for a two-wire to four-wire hybrid to eliminate echo. A simple system is required, one that does not need a plurality of additional active devices such as summing amplifiers, digital filters and nulling signal producing amplifiers. Preferably the system should vary the balancing impedance without altering the signal levels.

SUMMARY OF THE INVENTION

It is an object of the invention to provide a balancing impedance for a two-wire to four-wire hybrid to eliminate echo.

It is an object of the invention to make the balancing impedance automatically adjustable.

Another object of the invention is to provide a balancing impedance element wherein the overall impedance is proportionately determined by an automated potentiometer setting.

A further object of the invention is to provide a complex balancing impedance having resistive, capacitive and/or inductive elements.

These and other objects are provided in a balancing circuit for an active two-wire to four-wire hybrid. The invention has an input terminal coupled to the non-inverting input of a buffer amplifier arranged in a voltage-follower configuration. The output of the first buffer amplifier is coupled to an input of a digitally programmable attenuator. A digitally programmable attenuator suitable for use with the invention is the Dallas Semiconductor model DS1267. The programmable attenuator is functionally operative as a potentiometer, i.e., with a fixed resistance coupled between two terminals and a wiper digitally variable along the resistance in the manner of a voltage divider. The DS1267 device has pin connections for the first resistor terminal, the second resistor terminal and the wiper. The output from the first buffer amplifier is coupled to the first resistor terminal pin. The second resistor terminal pin is coupled to ground. The wiper is coupled to the non-inverting input of a second buffer amplifier. The second buffer amplifier is also connected in a voltage follower configuration. The output from this second buffer amplifier is coupled to a first terminal of a fixed impedance element. The impedance can be resistive, capacitive, inductive, or some combination thereof. When a purely resistive impedance is desired, for example, the fixed impedance element is simply a resistor. An opposite terminal of the fixed impedance element is coupled to the balancing impedance input terminal, whereby the impedance circuit defines a loop.

The digitally programmable attenuator is preferably operated under computer control to select one of 256 possible resistances. The voltage input to the first resistor terminal pin of the programmable attenuator from the first buffer amplifier is programmably divided at the "wiper" and input to the second buffer amplifier. The voltage delivered to the non-inverting input of the second buffer amplifier is dependent upon the particular programmed position of the wiper due to voltage division a applied to the output voltage of the first buffer amplifier. The output from the second buffer amplifier is coupled to a terminal of the fixed impedance element. The impedance element is coupled in series to the balancing impedance input. The current flow into the balancing impedance is, according to Ohm's law, the voltage input to the balancing impedance minus the voltage output by the second buffer amplifier divided by the value of the fixed impedance. Hence, since the voltage output by the second buffer amplifier is controlled by the position of the wiper of the digitally programmable attenuator, the value of the balancing impedance can be determined by the digitally programmable attenuator's setting.

DESCRIPTION OF THE PREFERRED EMBODIMENTS

The invention is a balancing impedance for self-balancing an electronic hybrid performing a conversion from a two-wire bi-directional line used to transmit and receive signals to a four-wire circuit having separate unidirectional transmit and receive signal paths. The impedance includes a balancing impedance input terminal for applying a balancing impedance input voltage, a digitally programmable attenuator having an input and an output, the input coupled to the balancing impedance input terminal providing attenuation of said balancing impedance input voltage, the attenuator means outputting an attenuated voltage, and fixed impedance means having a fixed impedance coupled in series between the balancing impedance input terminal and the attenuator output. A balancing impedance input current is defined by the balancing impedance input voltage minus the attenuated voltage divided by the fixed impedance of the fixed impedance element, the balancing impedance defined by the balancing impedance input voltage being divided by the balancing impedance input current.

Figure 1:
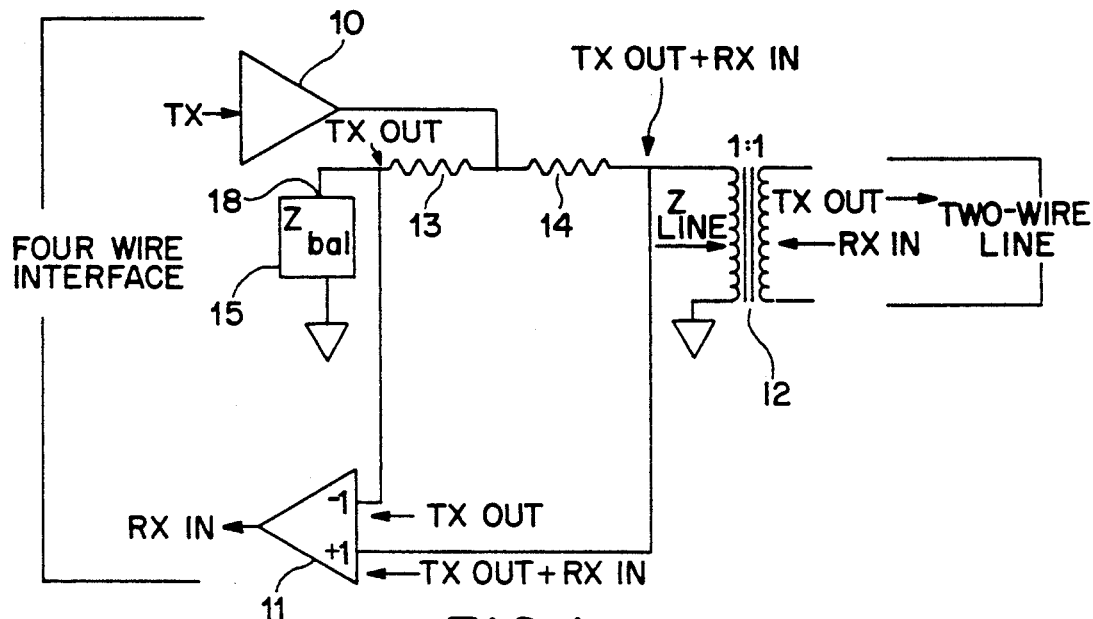
FIG. 1 is a schematic diagram showing a two-wire to four-wire hybrid.
Figure 2:
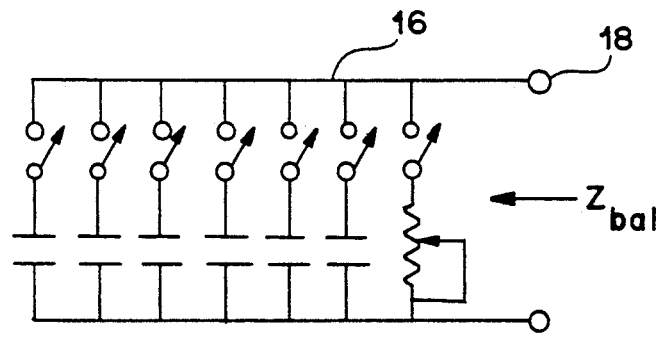
FIG. 2 is a schematic diagram of a prior art balancing network.

FIG. 1 depicts a schematic diagram of a typical active hybrid. A hybrid couples a two-wire transmission line to a four-wire terminal device and is typically used in telephone voice facilities and the like to interface between a two-wire bi-directional line used for both transmit and receive voice signals and four-wire circuits having separate transmit and receive signal paths. In FIG. 1, the four-wire interface has a transmit output signal TX applied to transmit amplifier 10 and a receive input signal RX output from receive amplifier 11. The two-wire circuit is coupled to the four-wire circuit through transformer 12. Transformer 12 is preferably a coupling transformer having a 1:1 turns ratio. The TX OUT signal from the four-wire circuit is applied to the two-wire circuit through transformer 12. The RX IN signal is applied from the two-wire circuit to the four-wire circuit also through transformer 12.

In operation, transmit amplifier 10 applies amplified four-wire transmit signal TX to the junction of resistor 13 and resistor 14. Resistor 13 and resistor 14 must be of equal value. As shown in FIG. 1, the portion of TX OUT appearing at the non-inverting input of receive amplifier 10 is determined by voltage division between resistor 14 and line impedance $Z_{LINE}$. This same signal appears as TX OUT on the two-wire line since transformer 12 has a 1:1 turns ratio. The impedance of $Z_{LINE}$ is unknown since it comprises parasitic capacity and resistance of the line, including a winding of transformer 12, and is dependent on line length. Receive signal RX IN from the two-wire line is coupled to the four-wire circuit through transformer 12 and also appears on the non-inverting input of receive amplifier 11.

A hybrid should provide as much isolation as possible between the four-wire transmit and receive voice paths to prevent echo. As shown in FIG. 1, this is typically accomplished by applying TX OUT to the inverting input of receive amplifier 11. Receive amplifier 11, which is a difference amplifier, will subtract the signal at its inverting input from that at its non-inverting input. In this case TX OUT will be subtracted, whereby the output of receive amplifier 11 will consist only of receive signal RX IN. For effective echo cancellation, the TX OUT signal applied to the inverting input of receive amplifier 11 must be equal in magnitude to the TX OUT signal applied to the non-inverting input of receive amplifier 11. As shown, the TX OUT signal applied to the inverting input of receive amplifier is taken from a point between resistor 13 and balancing impedance 15. The signal applied to the inverting input of receive amplifier 11, is therefore dependent upon voltage division between balancing impedance 15 and resistor 13. Since resistors 13 and 14 have equal resistance, the TX OUT signal applied to the inverting input of receive amplifier 11 will equal the TX OUT signal applied to the non-inverting input of receive amplifier 11 only if balancing impedance 15 is equal to impedance $Z_{LINE}$. If an accurate match is found between balancing impedance 15 and impedance $Z_{LINE}$, the signal appearing on the output of receive amplifier 11 will consist only of the desired RX IN signal applied by the two-wire line at transformer 12.

Prior art systems require that a technician empirically select the value of balancing impedance 15 to correspond with that of $Z_{LINE}$. Typically, balancing impedance 15 consisted of RC network 16. RC network 16 is, for instance, a switchable variable resistor in parallel with plural switchable capacitors. Typically, the variable resistance ranges from as low as 150Ω to as high as 1400Ω and the total capacity ranges from a few thousand pF to 0.200 μF or more.

A technician, while monitoring the output of receive amplifier 11 for the presence of any TX OUT signal can close the appropriate switches and/or adjust a continuously variable resistor with a screwdriver to eliminate any TX OUT signal appearing. This process is time consuming and imprecise since the capacitance is variable only in discrete steps through the switching arrangement. Since a technician must make the switch closures or resistor adjustments while monitoring the signal output by receive amplifier 11, balancing impedance 15 could be imprecisely set due to human error.

Figure 3:
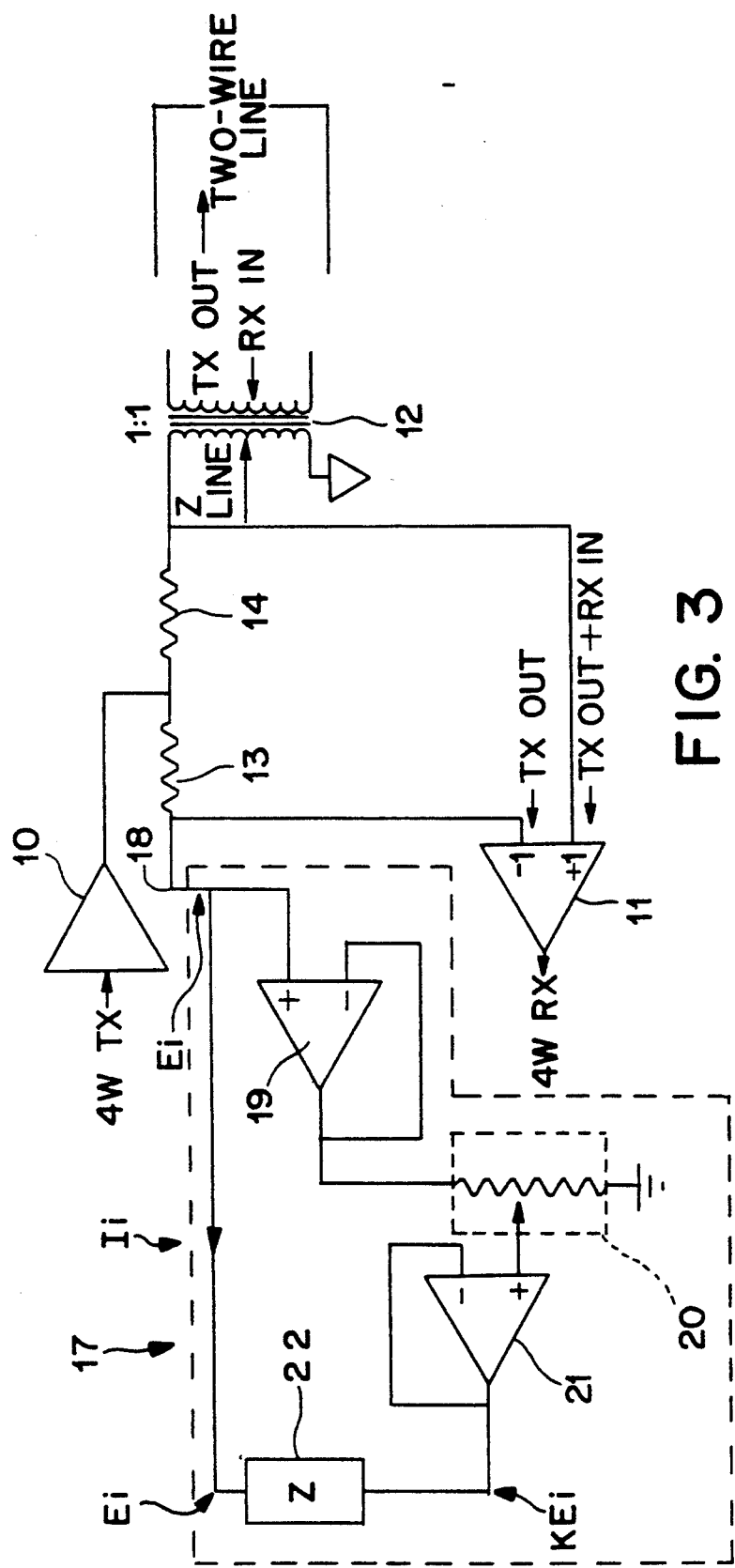
FIG. 3 is a schematic diagram of a two-wire to four-wire hybrid including the balancing impedance of the invention.
Figure 4:
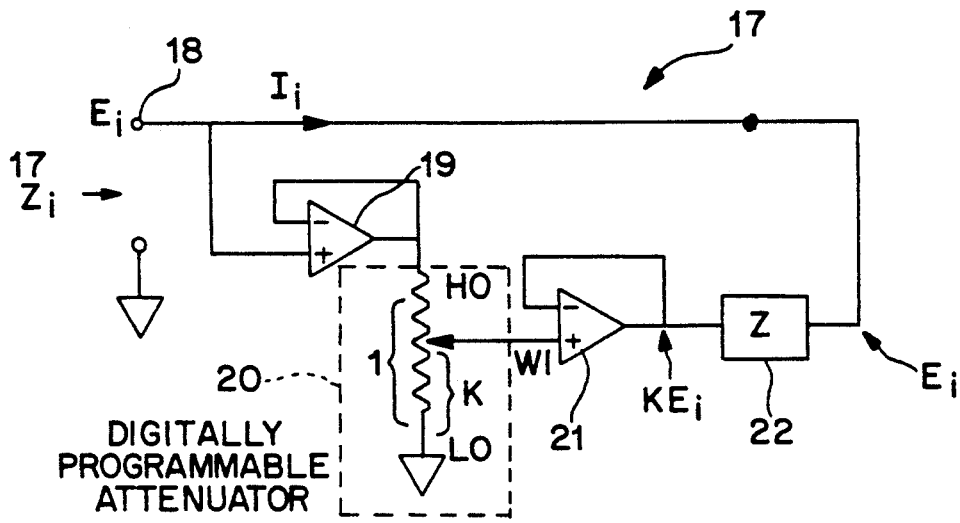
FIG. 4 is a schematic diagram of the balancing impedance of the invention using a generic impedance element Z.

FIGS. 3 and 4 show schematics of balancing impedance 17 ($Z_i$) which is automatically adjustable to provide a balancing impedance equal to the impedance of $Z_{LINE}$. Input terminal 18 is coupled to resistor 13. The signal applied to the inverting input of receive amplifier 11 is taken from the junction of input terminal 18 and resistor 13. This signal is identified as $E_i$. Input terminal 18 is coupled to the non-inverting input of a first buffer amplifier 19. The inverting input of first buffer amplifier 19 is coupled to the output of first buffer amplifier 19 in the known voltage follower configuration. The voltage follower configuration of first buffer amplifier 19 mandates that the output voltage of first buffer amplifier 19 is equal to the voltage applied to the non-inverting input of first buffer amplifier 19. The output of first buffer amplifier 19 is coupled to an input of a digitally programmable attenuator 20. The output of digitally programmable attenuator 20 is applied to the non-inverting input of second buffer amplifier 21. Second buffer amplifier 21 is also configured as a voltage follower whereby its output is equivalent to the voltage applied to the non-inverting input. Attenuator 20 reduces the voltage output by first buffer amplifier 19 by a set amount and applies the resulting attenuated voltage to the non-inverting input of second buffer amplifier 21. The attenuated voltage, hereby designated $KE_i$ (where K is 1 or less) is applied to a terminal of fixed impedance 22 ($Z_{22}$). Fixed impedance 22 is connected in series between the output of second buffer amplifier 21 and input terminal 18. Input voltage $E_i$ is thereby applied to the opposite terminal of fixed impedance 22. Since no current can flow through the very high impedance of the non-inverting input of first buffer amplifier 19, all current into balancing impedance 17 must flow through fixed impedance 22. The current through fixed impedance 22 is governed by the following equation: $I_i = (E_i - KE_i)/Z_{22}$. After computing the value of input current $I_i$ the value of balancing impedance 17 ($Z_i$) is calculated as follows: $Z_i = E_i/I_i$. The value of balancing impedance 17 ($Z_i$) is therefore controllable by the amount of attenuation (K) supplied by digitally programmable attenuator 20.

Digitally programmable attenuator 20 is preferably a Dallas Semi-Conductor DS1267 dual digital potentiometer chip. The DS1267 contains dual solid-state potentiometers. Each potentiometer is composed of 256 resistive sections. Between each resistive section and both ends of each potentiometer are tap points accessible to a wiper. The position of the wiper on the resistance array is set by an 8-bit register that controls which tap point is connected to the wiper output. Each of the resistive sections is of equal value, thus providing adjustment to one part in 256, or about ±0.4%.

When using a Dallas Semi-Conductor model DS1267 as the digitally programmable attenuator 20, the attenuator input will correspond to, for instance, one of the tap points at either terminal of the potentiometer designated by pin name L0 or H0. The terminal of the potentiometer not coupled to the output of first buffer amplifier 19 should be coupled to ground. The wiper of the DS1267 chip corresponds to the attenuator output. This wiper, as shown in FIGS. 3 and 4, is coupled to the non-inverting input of second buffer amplifier 21.

When using a DS1267 as digitally programmable attenuator 20, the signal will be attenuated by a magnitude of K:1 where K is variable in precise 256 increments between 0 and 1. Additionally, the magnitude of balancing impedance 17 ($Z_i$) is totally independent of the actual resistance value from terminal to terminal of the resistor in the DS1267. Information is written to and read from the wiper position registers via a 17-bit I/O shift register. In this manner, the position of the wiper, and therefore the value of K, is controllable by a serial data bit stream output, for instance, by a microprocessor.

The mathematical determination of the magnitude of balancing impedance 17 using a Dallas Semi-Conductor model DS1267 as the digitally programmable attenuator is similar to the analysis above. The voltage present on input terminal 18 is applied to the non-inverting input of first buffer amplifier 19. No current flows through first buffer amplifier 19 since the input impedance at the non-inverting terminal is infinite. The output of first buffer amplifier 19 is coupled to digitally programmable attenuator 20. When using a DS1267 as digitally programmable attenuator 20, the output of first buffer amplifier 19 is connected at either end of the internal resistor for instance at pin L0 or H0. The pin which is not connected to the output of first buffer amplifier 19 should be grounded. The wiper of the DS1267 corresponds to the output of digitally programmable attenuator 20. Wiper pin W1 is coupled to the non-inverting input of second buffer amplifier 21. The voltage appearing on the wiper of the DS1267 is a divided voltage dependent upon the position of the wiper. As noted above, the DS1267 has 256 equal resistor elements with a tap point between each. The voltage output on the wiper of the DS1267 is designated as $KE_i$ where K is variable in 256 increments between 0 and 1. K can also be made equal to 0 or equal to 1. Voltage $KE_i$ is applied to fixed impedance 22 through second buffer amplifier 21. The opposite end of fixed impedance 22 is coupled to input terminal 18. Accordingly, the input voltage appears on fixed impedance 22 ($Z_{22}$) at this junction. All current input to balancing impedance 17 must flow through fixed impedance 22 since it is prevented from flowing into first buffer amplifier 19 by the very high impedance of the input of first buffer amplifier 19. The input current to balancing impedance 17 is therefore calculable as follows:

$$I_i = \frac{E_i - KE_i}{Z_{22}} = E_i \frac{(1-K)}{Z_{22}}$$

The balancing impedance 17 ($Z_i$) can be calculated as follows:

$$Z_i = \frac{E_i}{I_i} = \frac{E_i}{\frac{E_i(1-K)}{Z_{22}}} = \frac{1}{1-K} Z_{22}$$

Figure 5:
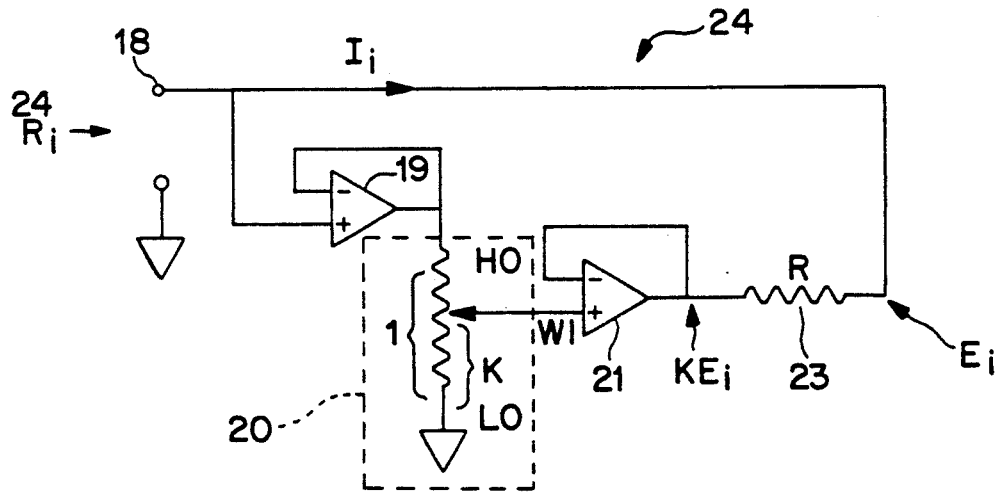
FIG. 5 is a schematic diagram of the balancing impedance of the invention, using a resistor as the impedance element.

Therefore, $Z_{i17} = \frac{Z_{22}}{1-K}$

Where $K = 0, \frac{1}{256}, \frac{2}{256}, \frac{3}{256}, \frac{4}{256} \ldots 1$ In FIG. 5, the fixed impedance is replaced by a fixed resistance 23. Fixed resistance 23 ($R_{23}$) is an impedance having purely resistive characteristics. The use of fixed resistance 23 imparts purely resistive characteristics to balancing impedance 24 ($R_i$). Balancing resistance 24 ($R_i$) can be calculated as follows:

$$R_{i(24)} = \frac{R_{23}}{1-K}$$

Where $K = 0, \frac{1}{256}, \frac{2}{256}, \frac{3}{256} \ldots 1$

Figure 6:
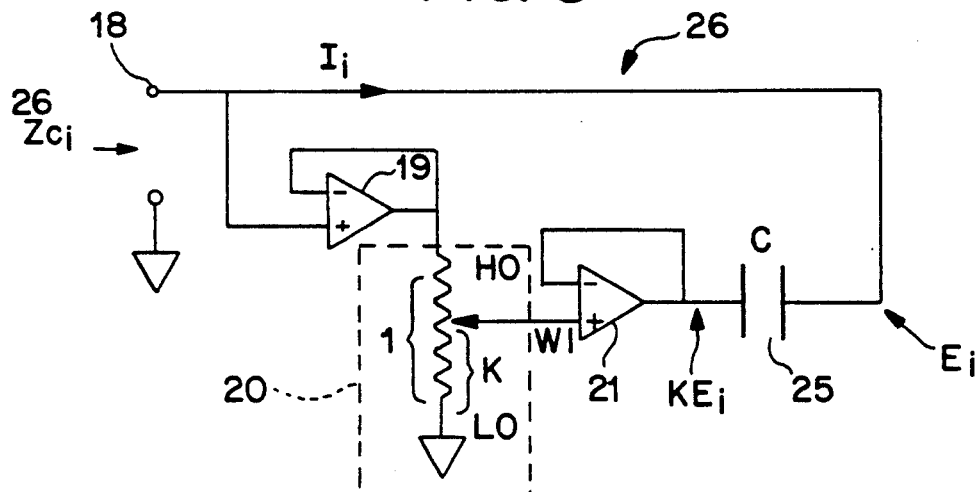
FIG. 6 is a schematic diagram of the balancing impedance of the invention using a capacitor as the impedance element.

In FIG. 6, the fixed impedance element is fixed capacitor 25 ($Z_6$). Fixed capacitor 25 imparts purely capacitive characteristics to balancing impedance 26 $Z_{ci}$. The balancing impedance for the circuit of FIG. 6 is calculable as above to arrive at the equation:

$$Z_{ci} = \frac{Z_{c(25)}}{1-K}$$

Where $Z_{c(25)}$ is the impedance of fixed capacitor 25.

The capacitive impedance $Z_c$ is defined by Ohms law:

$$Z_{c(25)} = \frac{1}{\omega c} (\angle -90°)$$

Where $\omega = 2\pi f$, and f is the frequency in hertz of the input signal. Balancing impedance $Z_{ci}$ of FIG. 6 therefore can be written:

$$Z_{ci} = \frac{Z_{c(25)}}{1-K} = \frac{\frac{1}{\omega C}}{1-K} \angle -90° = \frac{1}{\omega C(1-K)} \angle -90°$$

Where $K = 0, \frac{1}{256}, \frac{2}{256}, \frac{3}{256} \ldots 1$

Figure 7:
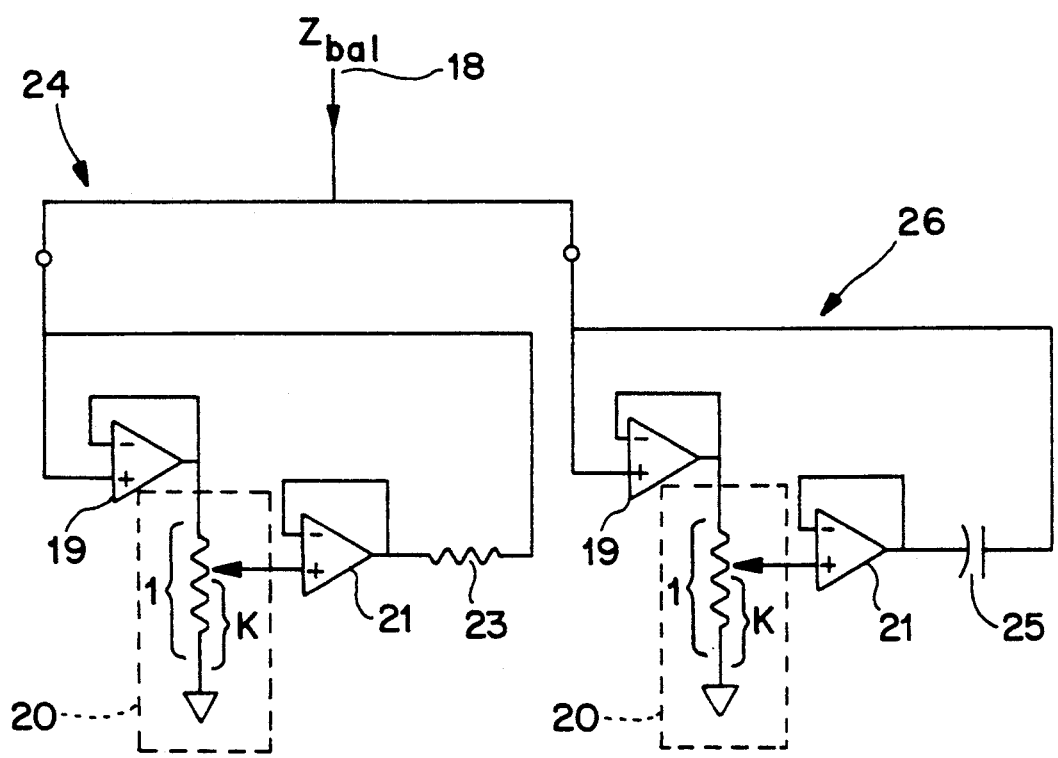
FIG. 7 is a schematic diagram of a complex balancing impedance.

Typically, the appropriate balancing impedance has both resistive and capacitive elements. A proper circuit for combining resistive and capacitive elements is shown in FIG. 7. As shown in FIG. 7, balancing resistance 24 is coupled in parallel with balancing capacitance 26 to input terminal 18. By combining balancing impedances as shown in FIG. 7, complex impedance functions can be synthesized. Complex balancing impedances are not limited to the circuit shown in FIG. 7, and include paralleling any number of balancing resistances, balancing capacitances and/or a comparable balancing network having an inductive impedance.

Figure 8:
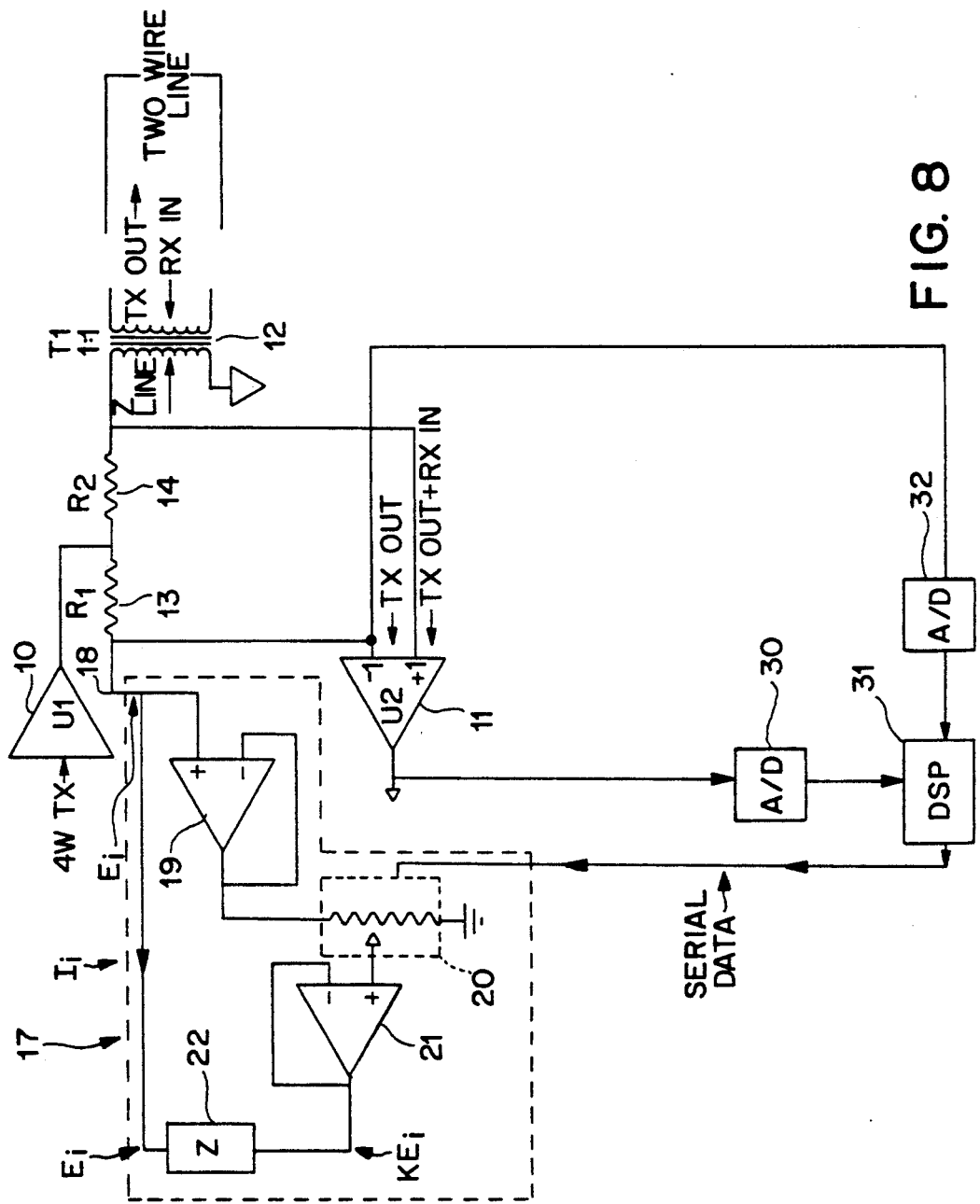
FIG. 8 is a schematic diagram of a two-wire to four-wire hybrid including the balancing impedance of the invention and a Digital Signal Processor (DSP) control block diagram.

In order to effectively monitor the function of the balancing impedance to ensure the cancellation of the TX OUT signal from the output of receive amplifier 11, the output of receive amplifier 11 should be continuously monitored as well as the output of transmit amplifier 10. As shown in FIG. 8 the A/D converter circuit 30 on the output of receive amplifier 11 is preferably coupled to circuitry including a programmed Digital Signal Processor (DSP) 31 and compared to the TX Out signal via A/D converter 32. If any part of TX OUT is sensed on the output of receive amplifier 11, DSP 31, under the control of a software algorithm, outputs a serial string of bits to digitally programmable attenuator 20 to set the balancing impedance, thereby eliminating the TX OUT signal from the output of receive amplifier 11. When a Dallas Semi-Conductor DS1267 is used as digitally programmable attenuator 20, the serial bit stream is coupled, for instance, to Pin DQ. The particular digital code input to pin DQ controls the position of the wiper arm relative to the tap points between the 256 individual resistive elements comprising the potentiometer of the DS1267 chip. The wiper position of the DS1267 as thereby set directly influences the magnitude of the balancing impedance. In this manner, the balancing impedance can be continually adjusted by DSP 31 under its software algorithm control to account for any changing operating conditions. TX OUT is therefore automatically and completely eliminated from the RX signal appearing on the output of receive amplifier 11. The large number of wiper positions available on the DS1267 (256) provides a high degree of resolution when synthesizing the balancing impedance.

It can be appreciated from the above that the invention provides excellent isolation between receive and transmit paths of a four-wire circuit in a two-wire to four-wire hybrid. The invention is unique in that the balancing impedance is chosen to a high resolution and is dependent upon, but does not directly correspond to, the value of resistance to which the programmable attenuator has been programmed.

All specific embodiments of the invention have been described in detail, it will be appreciated by those skilled in the art that various modifications and alternatives of those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What I claim is:

1. A balancing impedance for self-balancing an electronic hybrid converting a two-wire bi-directional line for transmitting and receiving signals to a four-wire circuit having separate transmit and receive signal paths, comprising:
    a balancing impedance input terminal for applying a balancing impedance input voltage;
    digitally programmable attenuator means having an input and an output, said input coupled to said balancing impedance input terminal, providing attenuation of said balancing impedance input voltage, said attenuator means outputting an attenuated voltage; and,
    fixed impedance means having a fixed impedance element coupled in series between said balancing impedance input terminal and said attenuator output, whereby a balancing impedance input current is defined by said balancing impedance input voltage minus said attenuated voltage divided by said fixed impedance of said fixed impedance means, the balancing impedance defined by the balancing impedance input voltage divided by the balancing impedance input current.

2. The balancing impedance of claim 1 further comprising a first zero gain buffer amplifier means having an input and an output interposed in series between said balancing impedance input terminal and said digitally programmable attenuator means, said first buffer amplifier input coupled to said balancing impedance input terminal, said first amplifier output coupled to said attenuator means input and a second zero gain buffer amplifier means having an input and an output interposed in series between said attenuator output and said fixed impedance means, said input of said second buffer amplifier coupled to said attenuator output, said output of said second amplifier coupled to said fixed impedance means.

3. The balancing impedance of claim 1 wherein said fixed impedance means is resistive.

4. The balancing impedance of claim 1 wherein said fixed impedance means is one of capacitive and inductive.

5. The balancing impedance of claim 1 wherein said fixed impedance means has resistive and capacitive elements.

6. The balancing impedance of claim 1 wherein the digitally programmable attenuator means is variable from zero attenuation to complete attenuation in evenly spaced increments.

7. The balancing impedance of claim 6 wherein the digitally programmable attenuator means is a digital potentiometer integrated circuit.

8. The balancing impedance of claim 3 further comprising a second balancing impedance connected in parallel, said second balancing impedance comprising a third zero gain buffer amplifier having an input coupled to said balancing impedance input terminal and an output coupled to an input of a second digitally programmable attenuator, said digitally programmable attenuator having an output coupled to an input of a fourth zero gain buffer amplifier, said fourth zero gain buffer amplifier having an output, and a second fixed impedance means having a fixed capacitive impedance, said second fixed impedance means coupled in series between said fourth zero gain amplifier output and said balancing impedance input terminal.

9. The balancing impedance of claim 1 wherein said digitally programmable attenuator means is coupled for data input to a microprocessor, the microprocessor being operable to sense transhybrid coupling and under control of a software algorithm to produce a balanced condition.

10. A self-balancing hybrid for converting a two-wire bi-directional line used to transmit and receive signals to a four-wire circuit having separate transmit and receive signal paths, comprising:
    a transmit amplifier having an output carrying amplified transmit signals originating in the four-wire circuit,
    first and second resistors, said resistors being of equal value, said resistors having first and second leads, said second lead of said first resistor coupled to said first lead of said second resistor thereby defining a resistor series and a voltage divider junction, said output of said transmit amplifier being coupled to said voltage divider junction;
    coupling means having a primary stage and a secondary stage for coupling the four-wire circuit to the two-wire circuit, said primary stage coupled to said second lead of said second resistor;
    difference receive amplifier means having a non-inverting input, an inverting input and an output, said output of the difference receive amplifier being a signal defined by the signal applied to the non-inverting input minus the signal applied to the inverting input, said non-inverting input coupled to said second lead of said second resistor, said inverting input coupled to said first lead of said first resistor;
    digitally programmable attenuator means having an input and an output, said attenuator input coupled to said first lead of said first resistor;
    an impedance element having a first and second terminal, said first terminal coupled to said attenuator output, said second terminal coupled to said first lead of said first resistor.

11. The self-balancing hybrid of claim 10 further comprising a first zero gain buffer amplifier means having an input and an output interposed in series between said first resistor's first lead and said digitally programmable attenuator means input, said first buffer amplifier input being coupled to said first resistor's first lead, said first buffer amplifier output coupled to said attenuator input and a second zero gain buffer amplifier means having an input and an output interposed in series between said attenuator output and said impedance element's first terminal, said second buffer amplifier input coupled to said attenuator output, said second buffer amplifier output coupled to said impedance element's first terminal.

12. The self-balancing hybrid of claim 10 further comprising a monitoring circuit coupled to said output of said receive amplifier, said monitoring circuit responsive to a presence of transmit signals present at said output of said receive amplifier, a microprocessor based control unit coupled between said monitoring circuit and said digitally programmable attenuator, said control unit instructed by a software algorithm to output digital programming data to said digitally programmable attenuator in response to sensing of transmit signals on said output of said receive amplifier by said monitoring circuit.

13. The self-balancing hybrid of claim wherein said digitally programmable attenuator is variable from zero attenuation to complete attenuation in 256 evenly spaced increments.

14. The self-balancing hybrid of claim 13 wherein the digitally programmable attenuator is a Dallas Semi-Conductor DS1267 integrated circuit.

15. The self-balancing hybrid of claim 10 wherein said impedance element is one of a resistor, capacitor and inductor.

16. The self-balancing hybrid of claim 10 wherein said coupling means is a transformer having a 1:1 turns ratio.

17. The self-balancing hybrid of claim 11 wherein said first and second zero gain buffer amplifier means are operational amplifiers connected in a voltage following configuration wherein the buffer amplifier inverting input is coupled to the buffer amplifier output.

* * * * *

UNITED STATES PATENT AND TRADEMARK OFFICE
CERTIFICATE OF CORRECTION

PATENT NO. : 5,249,225
DATED : September 28, 1993
INVENTOR(S) : Arthur B. Williams It is certified that error appears in the above-indentified patent and that said Letters Patent is hereby corrected as shown below:

Column 3, line 55, replace "a" with --as--.

Column 12, line 1, replace "claim" with --claim 10--.

Signed and Sealed this

Twenty-second Day of March, 1994

Attest:

BRUCE LEHMAN

Attesting Officer        Commissioner of Patents and Trademarks